United States Patent [19]

Stucker

[11] Patent Number: 5,922,343
[45] Date of Patent: *Jul. 13, 1999

[54] METHOD OF INTRODUCING CARBOHYDRASE ENZYMES TO A RUMINANT FEED FOR INCREASING THE RATE AND EXTENT OF FIBER DIGESTION IN THE RUMINANT

[76] Inventor: Dennis R. Stucker, 4216 Pisces Cir., Liverpool, N.Y. 13090-9998

[21] Appl. No.: 08/886,390

[22] Filed: Jul. 1, 1997

Related U.S. Application Data

[60] Provisional application No. 60/021,186, Jul. 3, 1996.

[51] Int. Cl.⁶ ..................................................... A23K 1/18
[52] U.S. Cl. ........................ 424/438; 424/442; 424/94.2; 424/94.61
[58] Field of Search .................................. 424/438, 442, 424/94.2, 94.61

[56] References Cited

U.S. PATENT DOCUMENTS

| | | | |
|---|---|---|---|
| 2,988,449 | 6/1961 | Hollenbeck | 99/4 |
| 3,250,622 | 5/1966 | Brooks | 99/2 |
| 4,144,354 | 3/1979 | Unno et al. | 426/2 |
| 4,218,437 | 8/1980 | Hiller | 424/94 |
| 4,225,584 | 9/1980 | Hiller | 424/94 |
| 4,235,878 | 11/1980 | Hiller | 424/94 |
| 4,239,750 | 12/1980 | Hiller | 424/94 |
| 4,983,403 | 1/1991 | Ardaillon et al. | 426/2 |
| 5,147,642 | 9/1992 | Lotz et al. | 424/94.61 |
| 5,314,692 | 5/1994 | Haarasilta et al. | 424/94.2 |
| 5,391,371 | 2/1995 | Jacobsen et al. | 424/94.2 |
| 5,612,055 | 3/1997 | Bedford et al. | 424/442 |
| 5,720,971 | 2/1998 | Beauchemin | 424/438 |

OTHER PUBLICATIONS

Nocek, James E., In Situ and Other Methods to Estimate Ruminal Protein and Energy Digestibility: A Review, *Journal of Dairy Science*, Vo. 71, No. 8, pp. 2051–2069, 1988.
Lewis, G.E., Sanchez, W.K., Treacher, R., Hunt, C.W., and Pritchard, G.T., Effect of Direct–Fed Fibrolytic Enzymes on Lactational Performance of Midlactation Holstein Cows, *Western Section*, vol. 46, pp. 310–313, Jul. 6–8, 1995.
Rode, L.M., Use of Feed Enzymes in Ruminant Nutrition, Animal Science Research and Development, Meeting Future Challenges, 1996.
Roenfeldt, Shirley, From Fiber to Milk: Here's How Ruminantion Works, *Dairy Herd Management*, pp. 36–37, Apr. 1997.
Quaife, Thomas, Leading Your Very Own "Band", *Dairy Herd Management*, pp. 38–42, Apr. 1997.
Franck, Rhonda, How To Monitor Rumen Activity, *Dairy Herd Management*, pp. 45–46, Apr. 1997.
Franck, Rhonda, Rumen 101: On–Farm Management, *Dairy Herd Management*, pp. 48–51, Apr. 1997.
Quaife, Thomas, Cornell Model: Still the Best at Predicting Rumen Efficiency, *Dairy Herd Management*, pp. 52–54, Apr. 1997.
Beauchemin, K.A., Rode, L.M. and Sewalt, V.J.H., Fibrolytic Enzymes Increase Fiber Digestiblity and Growth Rate of Steers Fed Dry Forages, *Canadian Journal of Animal Science*, pp. 641–642, 1995.
Beauchemin, K.A. and Rode, L.M., The Potential Use of Feed Enzymes for Ruminants.
Transition is in the Balance, Biovance Technologies, Inc., May 1996.
Product Sheet, Primalco Biotec, *Econase CE*, Apr. 27, 1995.
Technical Information and Specifications, Röhm Enzyme, Jun. 1997.
*Journal of Animal Science*, Supplement 1, 1992 (2 pages).
Stokes, M.R. and Zheng, S., The Use of Carbohydrase Enzymes as Feed Additives for Early Lactation Cows, Rumen Function Conference, Dec. 1995 (1 page).
Proposal Review Sheet, United States Department of Agriculture, 1997.
Luchini, N.D.; Broderick, G.A.; Hefner, D.L.; Derosa, R.; Reynal, S. and Treacher, R., Production Response to Treating Forage With Fibrolytic Enzymes Prior to Feeding to Lactating Cows, *Journal of Dairy Science*, vol. 80, Suppl. 1, 1997, p. 459.
Nussio, L.G., et al., Influence of a Cellulcase/Xylanase Complex (C/X) on Lactational Performance of Dairy Cows Fed Alfalfa Hay (AH) Based Diets, *Journal of Dairy Science*, vol. 80, Suppl. 1, 1997, p. 303.
Mandebvu, P., et al., Effect of Enzyme or Microbial Treatment of Bermudagrass Forage Before Ensiling on Nutrient Composition, Recovery and Digestion, *Journal of Dairy Science*, vol. 80, Suppl. 1, 1997, p. 304.

(List continued on next page.)

*Primary Examiner*—D. Gabrielle Brouillette
*Attorney, Agent, or Firm*—M. Paul Hendrickson

[57] ABSTRACT

A method for increasing the rate and extent of fiber digestion in a ruminant after ingestion by the ruminant is described. The method includes forming an aqueous mixture including carbohydrase enzymes active on structural carbohydrates of a forage and applying the aqueous mixture to the forage prior to ingestion by the ruminant at an application ratio grater than about 20 milliliters of the aqueous mixture per pound of forage dry matter.

18 Claims, No Drawings

OTHER PUBLICATIONS

Yang, W.Z.; Beauchemin, K.A.; and Rode, L.M., Effect of Enzyme Treatment or Grain Source on Lactation and Digestion in Dairy Cows, *Journal of Dairy Science*, vol. 80, Suppl. 1, 1997, p. 266.

Bughrara, S.S. and Sleper, D.A., Digestion of Several Temperate Forage Species by a Prepared Cellulase Solution, *Agronomy Journal*, vol. 78, Jan.–Feb. 1986, pp. 94–98.

Gabrielsen, B.C., Evaluation of Marketed Cellulases for Activity and Capacity to Degrade Forage, *Agronomy Journal*, vol. 78, Sep.–Oct. 1986, pp. 838–842.

McHan, Frank, Cellulase–Treated Coastal Bermudagrass Silage and Production of Soluable Carbohydrates, Silage Acids and Digestibility, *Journal of Dairy Science*, vol. 69, No. 2, 1986, pp. 431–438.

McHan, Frank, Pretreatment of Coastal Bermudagrass with Sodium Hydroxide and Cellulase Before Ensiling, *Journal of Dairy Science*, vol. 69, No. 7, 1986, pp. 1837–1846.

Donefer, E.; Niemann, P.J.; Crampton, E.W.; and Lloyd, L.E., Dry Matter Disappearance by Enzyme and Aqueous Solutions to Predict the Nutritive Value of Forages, pp. 965–970, 1964.

McQueen, R. and Van Soest, P.J., Fungal Cellulase and Remicellulase Prediction of Forage Digestiblity, *Journal of Dairy Science*, vol. 58, No. 10, pp. 1482–1491, 1975.

Chen, K.H., et al., Effect of Enzyme Treatment or Steam––Flaking of Sorghum Grain on Lactation and Digestion in Dairy Cows, *Journal of Dairy Science*, vol. 78, No. 8, 1995, pp. 1721–1727.

Henderson, Annie; McDonald, Peter; and Anderson, David, The Effect of a Cellulase Preparation Derived from Trichoderma viride on the Chemical Changes During the Ensilage of Grass, Lucerne and Clover, *Journal of Science and Food Agriculture*, vol. 33, 1982, pp. 16–20.

Allison, Michael and Borzucki, Ronald, Cellulase Methods for the Efficient Digestion of Grasses and Brassicas, *Journal of Science and Food Agriculture*, vol. 29, 1978, pp. 293–297.

Iowerth, D.; Jones, H.; and Hayward, Margaret V., The Effect of Pepsin Pretreatment of Herbage on the Prediction of Dry Matter Digestibility from Solubility in Fungal Cellulase Solutions, *Journal Science and Food Agriculture*, vol. 26, 1975, pp. 711–718.

Grattan Roughan, P. and Holland, Ross, Predicting in–vivo Digestibilities of Herbages by Exhaustive Enzymic Hydrolysis of Cell Walls, *Journal of Science and Food Agriculture*, vol. 28, 1977, pp. 1057–1064.

Feng, P.; Hunt, C.W.; Pritchard, G.T; and Julien, W.E., Effect of Enzyme Preparations on In Situ and In Vitro Degradation and In Vivo Digestive Characteristics of Mature Cool–Season Grass Forage in Beef Steers, *Journal of Animal Science*, vol. 74. 1996, pp. 1349–1357.

Burroughs, Wise; Woods, Walter; Ewing, S.A.; Greig, John; and Theurer, Brent, Enzyme Additions to Fattening Cattle Rations, pp. 459–464, 1961.

Marten, G.C.; Halgerson, J.L.; and Sleper, D.A., Near Infrared Reflectance Spectoscopy Evaluation of Ruminal Fermentation and Cellulase Digestion of Diverse Forages, Crop Science, vol. 28, 1988, pp. 163–167.

Campbell, G.L. and Bedford, M.R., Enzyme Applications for Monogastric Feeds: A Review, *Canadian Journal of Animal Science*, vol. 72, Sep. 1992, pp. 449–466.

Bailey, R.W. and Jones, D.H., Pasture Quality and Ruminant Nutrition: Hydrolysis of Ryegras Structural Carbohydrates With Carbohydrases in Relation to Rumen Digestion, *New Zealand Journal of Agricultural Research*, vol. 14, 1971, pp. 847–857.

Clark, Jennifer and Beard, Janet, Prediction of the Digestibility of Ruminant Feeds From Their Solubility in Enzyme Solutions, *Animal Feed Science and Technology*, vol. 2, 1977, pp. 153–159.

Goto, I. and Minson, D.J., Prediction of the Dry Matter Digestibility of Tropical Grasses Using a Pepsin–Cellulase Assay, *Animal Feed Science and Technology*, vol. 2, 1977, pp. 247–253.

Jones, D.I.H. and Hayward, Margaret V., A Cellulase Digestion Technique for Predicting the Dry Matter Digestibility of Grasses, *Journal of Science and Food Agriculture*, vol. 24, 1973, pp. 1419–1426.

Higginbothan, G.E.; Depeters, E.J.; Berry, S.L.; and Ahmadi, A., Effect of Adding a Cell Wall Degrading Enzyme to a Total Mixed Ration for Lactating Cows, *The Professional Animal Scientist*, vol. 12, pp. 81–85, 1995.

Kung Jr., Limin, Direct–fed Microbial and Enzyme Feed Additives, *1994 Direct–Fed Microbial, Enzyme & Forage Additive Compendium*, pp. 17–22, 1994.

Treacher, R.J. and Hunt, C.W., Recent Developments in Feed Enzymes For Ruminant Rations, Pacific Northwest animal Nutrition Conference, 1996, pp. 37–54.

Autrey, K.M., McCaskey T.A., and Little J.A., Cellulose Digestibility of Fibrous Materials Treated With Trichoderma Viride Cellulase, Journal of Dairy Science, vol. 58, No. 1, Jul. 15, 1974 pp. 67–71.

Forwood J.R., Sleper D.A. and Henning J.A., Topical Cellulase Application Effects on Tall Fescue digestibility, Agronomy Journal, vol. 82, Sep.–Oct. 1990 pp. 909–913.

METHOD OF INTRODUCING CARBOHYDRASE ENZYMES TO A RUMINANT FEED FOR INCREASING THE RATE AND EXTENT OF FIBER DIGESTION IN THE RUMINANT

This patent application claims the benefit of provisional patent application Ser. No. 60/021,186 which was filed on Jul. 3, 1996.

FIELD OF THE INVENTION

This invention relates generally to a method for increasing the digestibility of ruminant feed with exogenous enzymes, and in particular to a method of applying a dilute aqueous mixture of carbohydrase enzymes to ruminant feed at a high ratio of the aqueous mixture to feed so that the rate and extent of fiber digestion by the ruminant are increased.

BACKGROUND OF THE INVENTION

Prior research on the use of enzymes as feed additives has resulted in the creation and application of commercial products in the swine or poultry industry. In these applications, the applied enzymes supplement the endogenous digestive enzymes in the host animal; remove anti-nutritional factors such as β-glucans from problem feedstuffs such as barely; render certain nutrients readily available and enhance the energy value of feed stuffs. However, prior research on the addition of enzymes to ruminant diets has not supported the feeding of carbohydrase enzyme preparations to improve ruminal fiber digestion. This is due to the rapid degradation of the unprotected exogenous enzyme by ruminal bacterial protease which occurs prior to the enzyme effecting carbohydrate digestion.

SUMMARY OF THE INVENTION

The present invention is directed to the application of carbohydrase enzymes to diets of ruminate animals to increase the rate and extent of fiber (primarily forage) digestion by the ruminate. The enzymes are introduced into the diets by application of a dilute aqueous mixture of carbohydrase enzymes to the forage prior to ingestion by the animal. The present invention is also directed at enzyme application to diets of ruminant animals fed in commercial operations.

In one embodiment of the invention there is provided a method for increasing the rate and extent of fiber digestion in a ruminant, including forming an aqueous mixture of carbohydrase enzymes active on structural carbohydrates of a forage and applying the aqueous mixture to the forage prior to ingestion by the ruminant at an application ratio greater than about 20 milliliters of the aqueous mixture per pound of forage dry matter.

It is understood with respect to digestion, the term "rate" indicates the relative speed at which the fiber is broken down and "extent" corresponds to the total amount of fiber digested.

The novel aspects of this invention are set forth with particularity in the appended claims. The invention itself, together with further objects and advantages thereof, may be more fully comprehended by reference to the following detailed description of a presently preferred embodiment of the invention.

DETAILED DESCRIPTION OF THE PREFERRED EMBODIMENTS

In addition to enzyme formulation, it has been discovered that the dilution of the enzymes and high application ratios of the aqueous moisture to forage are critical parameters in the overall effectiveness of enzyme preparations added to ruminant diets. It has been further discovered that the successful application of the enzymes to the fiber is dependent upon adequate dispersion of the enzyme(s) over the surface area of the forage particles, and is substantially independent of the enzyme formulation. It is believed that successful application requires the enzymes to be applied in a dilute aqueous solution wherein the solution is applied at a relatively high application ratio. For example, for a given recommended amount of enzyme concentrate per pound of forage dry matter, the enzyme concentrate is diluted so as to apply at least 20 ml and preferably 200 ml or more of the dilute aqueous solution per pound of forage dry matter (DM). With the relatively high volumes of dilute solution per pound, i.e. >=200 ml, adequate dispersion can be obtained by spraying the solution over the feed load at a rate of approximately 10 to 40 gallons per minute while mixing for a relatively short time, approximately 3 to 5 minutes.

Relatively low volumes of solution per pound of forage dry matter (on the order of 20 ml dilute solution per pound of forage DM) have been found to yield beneficial results, however, the application time must be increased. That is, for these lower volumes of solutions, an application rate of approximately 0.5 to 2 gallons per minute is employed with an application time on the order of 10 minutes to achieve adequate dispersion of the enzymes. Generally, as the solution volume per pound of forage dry matter decreases, the length of application time increases to ensure that the enzymes are evenly distributed throughout the forage.

The aqueous mixture can be applied to ingestible materials, such as hay or other forage, immediately prior to ingestion. Preferably, the forage is mechanically turned as the spray is applied, for example by a reel or an auger, to ensure uniform coverage. The ingestible material is sprayed with the aqueous enzyme mixture from an applicator tube or a spray nozzle. In some applications, it may be desirable to heat the ingestible material prior to spraying. Alternatively, the aqueous diluents are heated to a maximum temperature of about 150° F. and mixed with the enzyme concentrate. The maximum application temperature is selected to substantially preclude degradation of the enzymes from thermal effects. Application of the diluted enzyme mixture at elevated temperatures may increase binding of the enzymes to the fiber.

For any given application rate, a spray nozzle configuration is selected to give adequate dispersion over the feed. It is preferred that the nozzle have a solid cone spray pattern to provide uniform distribution of the aqueous mixture to the feed. Suitable nozzles have an orifice size of from about 0.05 to 0.20 inches and a typical installation would have from two to six nozzles. The orifice size and number of nozzles selected depend on the rate of application required and the quantity of forage to be treated. Such methods of application are suitable for treating commercial quantities of forage, for example 500 LB to 3,000 LB of forage.

The diluent is usually water but other aqueous products or by-products can be used. Lacto-whey, a by-product of milk production which is predominantly water, for example 90% water, can be used as the diluent for the enzymes.

With the present application ratio of the aqueous mixture, the rate and extent of fiber digestion are increased. This increase may be obtained over a range of application temperatures at ambient or atmospheric pressure. That is, the present application ratio causes increased rate and extent of fiber digestion without requiring compression of the forage.

Once coverage with the dilute solution is achieved, it is not necessary to subject the wetted forage to mechanical compacting pressure or compression after application and before feeding. Further, with the present application ratio, the dilute aqueous solution may be applied over a broad temperature range. In fact, it is believed the dilute solution may be applied from approximately a freezing temperature to 150° F. The upper temperature limit is substantially determined by the denaturing temperatures of the enzymes.

It is not necessary to compact or cube the feed before feeding. The process of cubing the feed requires exposing the feed to high humidity, elevated temperatures and pressure which may initiate and cause substantial fiber degradation by the enzymes prior to ingestion by the ruminant.

Specifically, the present invention is directed at the effects of enzymes active on structural carbohydrates (fiber) on the digestion of forage. These enzymes include, but are not limited to, carbohydrase enzymes active on a structural carbohydrate, for example, cellulase, cellobiase, arabanase, pectanase, polygalacturonase and xylanase.

It is also recognized that genetic engineering is creating previously unavailable carbohydrase enzymes, enzyme activity combinations and enzyme activity ratios which can be used for fiber degradation. Such engineering has produced specialized enzyme activities within a generic classification. For example, exocellulase and endocellulase now exist within the cellulase class of carbohydrase enzymes.

The enzymes may be commercially available in a concentrated form containing at least about 70% of active enzymes. The concentrate is preferably diluted with an aqueous diluent in a ratio of approximately 6 to 60 ml of the concentrate to approximately 400 to 16,000 ml of the aqueous mixture. In the present commercially available form, the concentrate is approximately 90% active enzymes and 10% carriers, such as glucose and glycerol. A suitable commercial carbohydrase enzyme concentrate, Rumenase, is available from Agriscience Inc. of Liverpool, N.Y. Rumenase concentrate typically contains four major enzymes with the following activities:

| Cellulase | 1,050 | ECU/ml |
|---|---|---|
| Cellobiase | 17.2 | CBU/ml |
| Xylanase | 43,000 | BXU/ml |
| Polygalacturonase | 1,245 | PGU/ml |

At the preferred dilution, on a per head per day basis and assuming an intake of 20 lb. of forage dry matter per day, approximately 20 ml of the carbohydrase concentrate is added to 3,980 ml of water to form a 4,000 ml dilute aqueous solution, i.e. 200 ml of an aqueous mixture of carbohydrase enzymes per pound of forage dry matter.

EXAMPLES

In testing with lactating dairy animals, dietary forage of a barley based commercial concentrate, TMR (50% hay crop silage, 5% alfalfa hay and 45% barley-based concentrate) is sprayed with one of two treatments while mixing in a farm scale mixer wagon. The control group dietary forage is sprayed with water only. The treatment group dietary forage receives a dilute aqueous enzyme solution diluted as follows: 1.1 liter of enzyme concentrate (Rumenase) in about 250 liters of water per ton of forage dry matter.

The water and the aqueous enzyme mixture are applied with a hose end sprayer.

Sufficient time, at least about 3 minutes, is allowed for the enzyme to be absorbed and bound by the forage before it is fed to the cow.

The cow is given access to the forage for up to about 6 hours after treatment of the forage and is preferably fed twice per day.

TMR samples are evaluated in situ in their original wet form as follows: Approximately 5 g of material (dry weight) are weighed into forage bags and placed in the rumen of a fistulated lactating cow. Each set of samples are evaluated in the same cow on the same day to allow for comparison between treatments.

Samples are incubated for 12 or 24 hours in the rumen of the lactating dairy cow.

All in situ bags of TMR samples for a given time point are placed into a weighted nylon mesh bag and attached to the cover of the ruminal cannula with a length of nylon cord sufficient to allow free movement in the rumen.

A single nylon mesh bag is removed at the end of each incubation period. Immediately after removal from the rumen, samples are immersed in cold (11° C.) water to end fermentation and remove extraneous ruminal contents. In situ bags are subsequently removed from the nylon mesh bag and rinsed three times in three volumes of cold water. Samples are frozen until analysis is performed. The samples are thawed out, washed with cold water, dried at 60° C. in a convection oven for 48 hours and then weighed. Dry matter disappearance is calculated. Neutral detergent fiber (NDF) disappearance is determined by conventional wet chemistry procedures for both original material and in situ residues.

In the following Examples 1–3 the forage was treated with water or dilute Rumenase at an application ratio of 250 ml/LB forage dry matter. The diet was fed to cows so that each cow received 20 LB dry forage matter diluted with approximately 5 liters of water or aqueous enzyme mixture. Access to the feed was limited to a maximum of 6 hours.

Example 1

Digestibility studies on individual forage ingredients and on TMR's treated with water and aqueous Rumenase.

| | NDF/DIGESTIBILITIES | | |
|---|---|---|---|
| TREATMENT | Corn Silage | Alfalfa Hay | TMR |
| Water | 20.1% | 25.0% | 23.2% |
| Rumenase | 35.2% | 34.4% | 31.8% |

Temperature effect: A neutral detergent fiber (NDF) was treated with water at 40° F., diluted Rumenase at 40° F. or diluted Rumenase at 120° F. and the level at digestibility of the feed was determined.

| TREATMENT | Temp (°F.) | NDF/DIGESTIBILITY |
|---|---|---|
| Untreated | 40 | 12.7% |
| Rumenase | 40 | 16.0% |
| Rumenase | 120 | 21.7% |

Example 3

Diluent effect: Samples of NDF were treated with either whey or Lacto-whey. Lacto-whey is regular whey that is ammoniated with ammonia to raise the protein content. Rumenase diluted with water or Lacto-whey was sprayed on the feed and fed to cows.

|  | DILUENT | NDF/DIGESTIBILITY |
| --- | --- | --- |
| TRIAL 1 | | |
| Untreated | | 26.4% |
| Rumenase | water | 50.7% |
| Rumenase | whey | 48.2% |
| TRIAL 2 | | |
| Untreated | | 21.9% |
| Rumenase | water | 33.6% |
| Rumenase | Lacto-whey | 30.1% |

Example 4

Samples of corn silage were treated with Rumenase diluted at a low dilution rate (20 ml/LB of forage dry matter) and a high dilution rate (200 ml/LB of forage dry matter). At both dilution rates the level of Rumenase was constant at 0.75 ml/LB of forage dry matter.

| | NDF/DIGESTIBILITY (%) | |
| --- | --- | --- |
| | 12 hour | 24 hour |
| Control | 6.9 | 18.4 |
| Rumenase (low dilution) | 9.4 | 17.9 |
| Rumenase (high dilution) | 12.6 | 20.0 |

The results of this trial showed that the addition of Rumenase at the low dilution rate increased the rate of digestion, but not extent of digestion. This is indicated by the 36% increase in NDF disappearance at 12 hours, but no improvement at 24 hours. However, the addition of Rumenase with a high dilution rate increases NDF disappearance at both 12 and 24 hours, 83% and 9% respectively, thereby enhancing the extent of digestion.

The present method increases the rate and extent of fiber digestion within the ruminant without significant initiation of enzymatic action prior to ingestion so that essentially all of the enzymatic action is in the ruminant.

While the invention has been described in connection with a presently preferred embodiment thereof, those skilled in the art will recognize that many modifications and changes may be made therein without departing from the true spirit and scope of the invention which, accordingly, is intended to be defined solely by the appended claims.

What is claimed is:

1. A method for increasing the rate and extent of fiber digestion in a ruminant, comprising:
   a) forming a diluted aqueous mixture of carbohydrase enzymes active on structural carbohydrates of a harvested forage by diluting a carbohydrase concentrate at a concentration ranging from about 6 milliliters to about 60 milliliters of the carbohydrase concentrate to about 400 milliliters to about 16,000 milliliters of water;
   b) applying the diluted aqueous mixture to the harvested forage at an application ratio greater than about 20 milliliters of the diluted aqueous mixture per pound of forage dry matter while concurrently turning and mixing the forage with the diluted mixture to uniformly distribute the diluted mixture throughout the harvested forage and thereby provide a carbohydrase treated forage; and
   c) feeding the treated forage to the ruminant prior to substantial fiber digestion by the carbohydrase.

2. The method of claim 1 in which the application ratio is at least 150 milliliters per pound of forage dry matter.

3. The method of claim 1 in which the step of forming the aqueous mixture further comprises diluting a carbohydrase concentrate in a ratio of about 1 mil concentrate to between about 20 ml and 400 ml of water.

4. The method of claim 3 in which the carbohydrase concentrate is at least approximately 70% active carbohydrase enzymes.

5. The method of claim 1 in which the step of applying the diluted aqueous mixture comprises concurrently turning the forage and spraying the aqueous mixture onto the turning forage.

6. The method of claim 5 further comprising spraying the aqueous mixture in a solid cone pattern at a rate of from about 10 to 40 gallons per minute for about 3 to 5 minutes.

7. The method of claim 1 in which the aqueous mixture includes at least one of cellulase, cellobiase, arabanase, pectanase, polygalacturonase and xylanase.

8. A method for increasing the rate and extent of fiber digestion in a ruminant, comprising:
   a) forming a diluted aqueous mixture containing an effective amount of a carbohydrase enzyme concentrate active on structural carbohydrates of a harvested forage at a concentration ranging from about 6 to about 60 milliliters carbohydrase enzyme concentrate diluted in about 400 to about 16,000 milliliters of the aqueous mixture;
   b) uniformly applying the aqueous mixture to the harvested forage prior to ingestion by the ruminant at an application ratio of at least approximately 20 ml of the aqueous mixture per pound of forage dry matter by spraying the aqueous mixture onto the forage while turning the forage so as to uniformly distribute the mixture throughout the harvested forage and provide a treated forage having the concentrate uniformly distributed therein; and;
   c) feeding the treated forage to the ruminant prior to substantial fiber digestion by the carbohydrase.

9. The method of claim 8 wherein spraying the aqueous mixture while turning the forage includes the turning of the forage with an auger while spraying the aqueous mixture onto the forage.

10. The method of claim 8 further comprising applying the aqueous mixture to the forage at an application ratio of at least 150 milliliters of the aqueous mixture per pound of forage dry matter.

11. The method of claim 8 in which the aqueous mixture includes at least one of cellulase, cellobiase, arabanase, pectanase, polygalacturonase and xylanase.

12. A method for increasing the rate and extent of fiber digestion in a ruminant, comprising:
   a) forming an aqueous mixture of carbohydrase enzymes active on structural carbohydrates of the fiber in a harvested forage and containing an effective amount of the enzymes so as to increase the rate and extent of fiber digestion after ruminant ingestion by diluting a carbohydrase concentrate containing the enzymes at a concentration ranging from about 6 milliliters to about 60 milliliters of the carbohydrase concentrate for each 400 milliliters to 16,000 milliliters of water;

b) mechanically turning the forage and uniformly applying the effective amount of the aqueous mixture over a surface area of the turning forage at an application ratio of at least 20 ml of the aqueous mixture per pound forage dry matter to obtain a treated forage; and c) introducing the treated forage into the ruminant prior to substantial activity by the carbohydrase enzymes on the forage.

13. The method according to claim 12 wherein the mechanical turning and the uniformly applying the effective amount of the aqueous mixture over the surface of the turning forage includes the turning of the forage with an auger while applying the aqueous mixture over the surface by spraying.

14. The method of claim 12 in which the application ratio is at least 150 milliliters per pound of forage dry matter.

15. The method of claim 12 further comprising applying the mixture to the forage at least approximately three minutes prior to ingestion by the ruminant.

16. The method of claim 12 further comprising forming the aqueous mixture to contain 12 to 20 milliliters of a carbohydrase enzyme concentrate in a mixture of at least 3,500 to 4,500 ml of the aqueous mixture.

17. The method of claim 16 in which the concentrate is at least approximately 70% active carbohydrase enzymes.

18. The method of claim 12 in which the aqueous mixture includes at least one of cellulase, cellobiase, arabanase, pectanase, polygalacturonase and xylanase.

* * * * *